(No Model.)
T. W. WOOD.
COMBINATION KNIFE, COMPASSES, AND RULER.
No. 328,911. Patented Oct. 20, 1885.
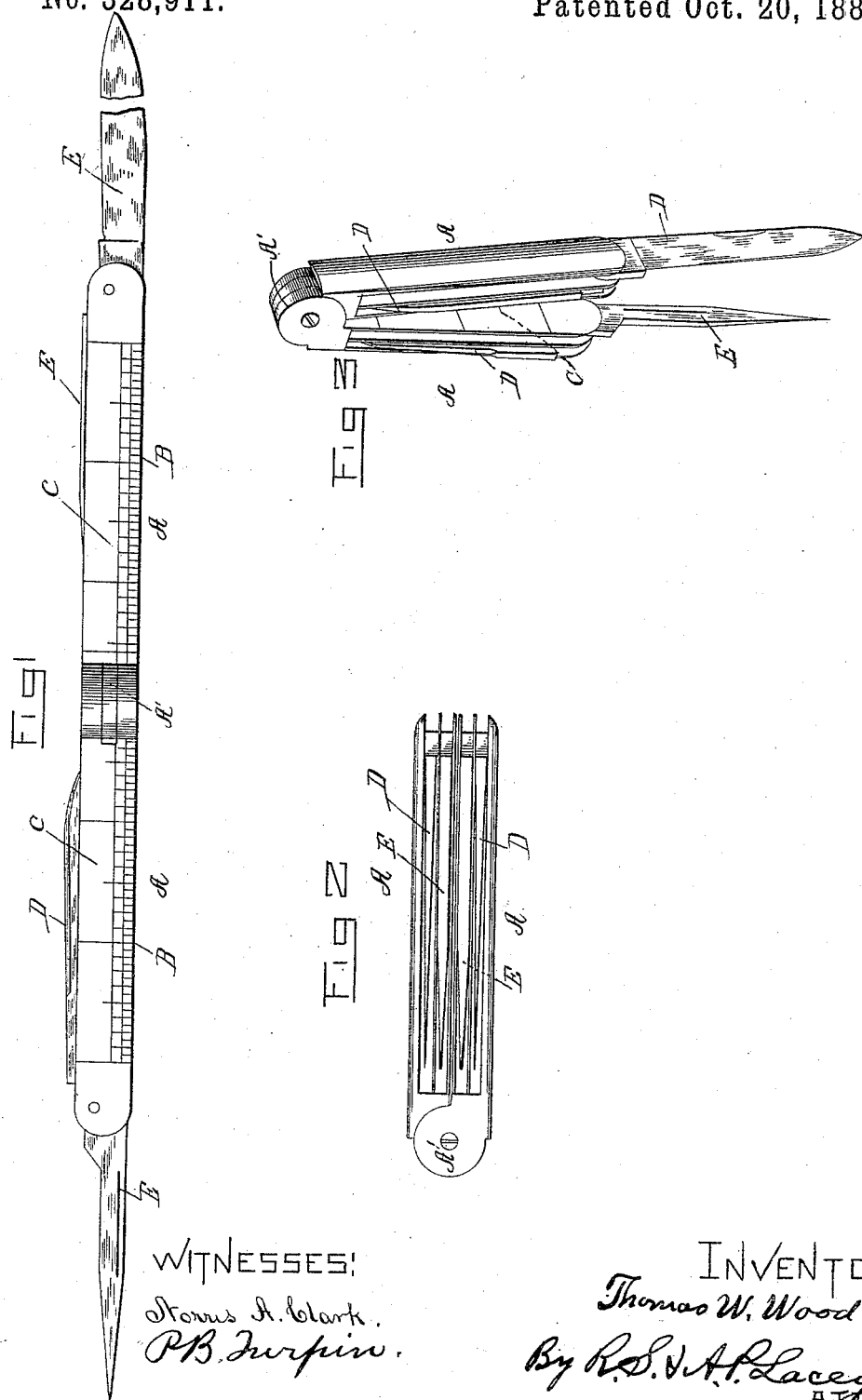
WITNESSES:
INVENTOR
Thomas W. Wood
By R. S. & A. P. Lacey
ATTYS

UNITED STATES PATENT OFFICE.

THOMAS W. WOOD, OF ASBURY PARK, NEW JERSEY.

COMBINATION KNIFE, COMPASSES, AND RULER.

SPECIFICATION forming part of Letters Patent No. 328,911, dated October 20, 1885.

Application filed February 28, 1885. Serial No. 157,387. (No model.)

*To all whom it may concern:*

Be it known that I, THOMAS W. WOOD, a citizen of the United States, residing at Asbury Park, in the county of Monmouth and State of New Jersey, have invented certain new and useful Improvements in Combination-Tools; and I do declare the following to be a full, clear, and exact description of the invention, such as will enable others skilled in the art to which it appertains to make and use the same, reference being had to the accomanying drawings, and to the letters and figures of reference marked thereon, which form a part of this specification.

This invention has for an object to provide an implement comprising, in combination, certain elements so formed, constructed, and arranged that the device may be conveniently adjusted to serve as a pocket-knife, a pocket-rule, straight-edge, washer-cutter, compasses, or for the purpose of cutting leather or other soft material into strips having parallel edges.

The invention consists in certain novel constructions, combinations, and arrangements whereby I attain the desired object, all of which will be hereinafter more fully described and specifically pointed out in the claims.

In the drawings, Figure 1 is a side view of my implement opened. Fig. 2 is a front edge view of the same closed, and Fig. 3 is a perspective view of the implement with the parts suitably arranged to serve as a washer-cutter.

The handle-sections A A are hinged or connected by compass-joint A' at one end. The outer edges, B, of these handle-sections are formed accurately in straight lines to adapt such edges for use as straight-edges, either when the sections are opened, as shown in Fig. 1, or closed as when in Fig. 2.

The meeting faces C C of the handle-sections are graduated from end to end into inches, as shown, or may be according to any other system of graduation desired.

To the outer end of each of the sections A is pivoted a cutting-blade, D, and a pivot-point, E, or scriber of about the same length as shown. These blades and points may be turned outward, as shown in Figs. 1 and 3, or may be turned in and incased within the handle-sections, as shown in Fig. 2, the said sections being properly adapted similarly to a pocket-knife to receive the blades and pivot-points, as will be understood.

In use as a straight-edge or pocket-rule the blades and scriber may be incased within the sections.

When desired in use as a washer-cutter, a pivot-point and a blade are turned one out of each handle-section, as shown in Fig. 3, and by turning on joint A' the device may be set to cut washers of any desired diameter, which may be readily gaged by the graduations C. In this use one scriber in one section and a blade in the other section would give good results. I prefer, however, to use a blade in each section, because by such construction the said blades will serve to cut strips of leather or other suitable material with parallel edges, and the two scribers may be adjusted to adapt the device for use as dividers or as compasses, as may be desired.

When not in use the blades and scribers may be turned into the handle-sections, as shown in Fig. 2, and the implement is in a suitable arrangement to be carried in the pocket.

My implement will be found of use to harness-makers, carpenters, machinists, and similar classes of mechanics, as well as to the farmer and other persons who may desire to cut washers, describe circles, or use dividers.

The implement is simple of construction, may be manufactured at slight cost, and will be durable and not likely to get out of order.

Having thus described my invention, what I claim, and desire to secure by Letters Patent, is—

1. An implement, substantially as herein described, consisting of handle-sections connected together at one end by compass joint or hinge, a pivot-point hinged to the outer end of one section and capable of being turned outward from or incased within the said section, and a cutting-blade correspondingly supported and arranged in the other section, substantially as set forth.

2. An implement, substantially as herein described, comprising two handle-sections connected together at one end by hinge or compass joint, and pivot-points and cutting-blades pivoted to the outer end of each of the said sections and capable of being turned outward from or incased within their respective sections, substantially as set forth.

3. The implement herein described, consisting of the handle-sections connected at one end by compass-joint, and having their inner or meeting faces flattened and graduated as described, and scribers and cutting blades pivoted one to the outer end of each of the handle-sections, substantially as and for the purposes set forth.

4. An implement comprising, in combination, pivoted handle-sections graduated on their inner or meeting faces and pivot-points and blades pivoted to the outer ends of such sections, all arranged substantially as described, whereby the said implement is capable of use as a pocket-rule, knife, dividers, washer-cutter, &c., as set forth.

In testimony whereof I affix my signature in presence of two witnesses.

THOMAS W. WOOD.

Witnesses:
SAML. A. PATTERSON,
JAMES R. ROYCE.